(12) United States Patent
Watanobe et al.

(10) Patent No.: US 10,272,498 B2
(45) Date of Patent: Apr. 30, 2019

(54) COMPOSITE SINTERED MATERIAL AND SURFACE-COATED BORON NITRIDE SINTERED MATERIAL TOOL

(71) Applicant: SUMITOMO ELECTRIC HARDMETAL CORP., Itami-shi (JP)

(72) Inventors: Naoki Watanobe, Itami (JP); Yusuke Matsuda, Itami (JP); Katsumi Okamura, Itami (JP); Nozomi Tsukihara, Itami (JP); Makoto Setoyama, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 142 days.

(21) Appl. No.: 15/121,138

(22) PCT Filed: Mar. 20, 2015

(86) PCT No.: PCT/JP2015/058478
§ 371 (c)(1),
(2) Date: Aug. 24, 2016

(87) PCT Pub. No.: WO2015/163060
PCT Pub. Date: Oct. 29, 2015

(65) Prior Publication Data
US 2017/0014915 A1    Jan. 19, 2017

(30) Foreign Application Priority Data
Apr. 25, 2014   (JP) .................................. 2014-091728

(51) Int. Cl.
  *B23B 27/14*   (2006.01)
  *C04B 35/583*   (2006.01)
(Continued)

(52) U.S. Cl.
  CPC .......... *B23B 27/148* (2013.01); *C04B 35/583* (2013.01); *C04B 35/5831* (2013.01);
(Continued)

(58) Field of Classification Search
  USPC .......... 51/307, 309; 428/325, 697, 698, 699, 428/704
  See application file for complete search history.

(56) References Cited

U.S. PATENT DOCUMENTS 5,328,875 A  *  7/1994  Ueda ..................... B23B 27/148
                                                    51/307
6,001,757 A     12/1999  Fukaya et al.
(Continued)

FOREIGN PATENT DOCUMENTS

EP     1780186 A2    5/2007
JP     H10-114575 A  5/1998
(Continued)

OTHER PUBLICATIONS

Bindal et al "High pressure sintering of cubic boron nitride" Journal of Materials Science 21 (1986) p. 4347-4351.*
(Continued)

*Primary Examiner* — Archene A Turner
(74) *Attorney, Agent, or Firm* — Baker Botts L.L.P.; Michael A. Sartori

(57) ABSTRACT

A composite sintered material contains cubic boron nitride particles and binder particles. The composite sintered material contains 40 vol % or more and 80 vol % or less of the cubic boron nitride particles. The binder particles contain TiCN particles. The composite sintered material shows a first peak belonging to a (200) plane of the TiCN particles in a range in which a Bragg angle 2θ is 41.7° or more and 42.6° or less in an X-ray diffraction spectrum measured using a Cu-Kα ray as a ray source.

4 Claims, 3 Drawing Sheets

(51) Int. Cl.
    *C04B 35/5831*     (2006.01)
    *C04B 41/89*     (2006.01)
    *C04B 41/00*     (2006.01)
    *C04B 41/52*     (2006.01)

(52) U.S. Cl.
    CPC ............ *C04B 41/009* (2013.01); *C04B 41/52* (2013.01); *C04B 41/89* (2013.01); *B23B 2222/84* (2013.01); *B23B 2226/125* (2013.01); *B23B 2228/105* (2013.01); *B23B 2228/24* (2013.01)

(56) References Cited

U.S. PATENT DOCUMENTS

| | | |
|---|---|---|
| 2007/0099030 A1 | 5/2007 | Dahl |
| 2009/0056232 A1 | 3/2009 | Can et al. |
| 2012/0035045 A1 | 2/2012 | Fukushima et al. |
| 2013/0108850 A1 | 5/2013 | Kudo et al. |

FOREIGN PATENT DOCUMENTS

| | | |
|---|---|---|
| JP | 2007-144615 | 6/2007 |
| WO | WO-2010/119962 A1 | 10/2010 |
| WO | WO-2012/005275 A1 | 1/2012 |

OTHER PUBLICATIONS

International Search Report in International Application No. PCT/JP2015/058478, dated May 12, 2015.

\* cited by examiner

COMPOSITE SINTERED MATERIAL AND SURFACE-COATED BORON NITRIDE SINTERED MATERIAL TOOL

TECHNICAL FIELD

The present invention relates to a composite sintered material containing cubic boron nitride particles and binder particles, and to a surface-coated boron nitride sintered material tool, in which at least a cutting edge portion includes a composite sintered material and a coating layer provided on a surface of the composite sintered material.

BACKGROUND ART

Since cubic boron nitride (which may be hereinafter referred to as "cBN") is the highest hardness substance next to a diamond, it is used for various kinds of cutting tools and the like. Such cBN is generally used as a composite sintered material together with a binder, rather than used alone.

Recently, a work material and cutting conditions have been diversified in terms of applications to a cutting tool, which leads to a high level of demands made for a cutting tool using cBN. Particularly, it is desired to improve wear resistance and fracture resistance.

For example, Japanese Patent Laying-Open No. 2007-144615 (PTD 1) discloses a cBN cutting tool insert that is excellent in resistance to chipping and cutting edge breakage, and also discloses that the composition of a binder included in this insert exhibits a wide composition range of $TiC_{1-x}N_x$. WO2010/119962 (PTD 2) discloses a composite sintered material that allows the fracture resistance and the toughness to be improved without reducing the wear resistance, and also discloses that the binder included in the composite sintered material contains titanium nitride and titanium carbonitride.

CITATION LIST

Patent Document

PTD 1: Japanese Patent Laying-Open No. 2007-144615
PTD 2: WO2010/119962

SUMMARY OF INVENTION

Technical Problem

It turned out that, when hardened steel is processed, boundary wear occurs in a boundary portion at an end cutting edge corresponding to one end of a wear portion even if a cBN cutting tool insert disclosed in PTD 1 or a cutting tool including a composite sintered material disclosed in PTD 2 is used. When the tool undergoing boundary wear is used for processing, the surface roughness in the processed surface (finished surface) of the workpiece deteriorates, which leads to a decrease in processing accuracy.

Thus, in consideration of the above-described circumstances, an object of the present invention is to provide a composite sintered material that allows improvement in processing accuracy also in hardened steel processing and the like, and another object thereof is to provide a surface-coated boron nitride sintered material tool including such a composite sintered material.

Solution to Problem

A composite sintered material according to one embodiment of the present invention contains cubic boron nitride particles and binder particles. The composite sintered material contains 40 vol % or more and 80 vol % or less of the cubic boron nitride particles. The binder particles contain TiCN particles. The composite sintered material shows a first peak belonging to a (200) plane of the TiCN particles in a range in which a Bragg angle 2θ is 41.7° or more and 42.6° or less in an X-ray diffraction spectrum measured using a Cu-Kα ray as a ray source. Assuming that a horizontal axis x in the X-ray diffraction spectrum indicates a Bragg angle 2θ, that a vertical axis y in the X-ray diffraction spectrum indicates diffraction intensity, and that a maximum value of a peak height of the first peak is defined as $I_{max}$, a difference between a maximum value and a minimum value of Bragg angles 2θ is 0.4° or less, the Bragg angles 2θ being measured at two or more intersection points of a straight line $y=I_{max}/2$ and the first peak.

Advantageous Effects of Invention

According to the above description, the processing accuracy can be improved also in hardened steel processing and the like.

DESCRIPTION OF EMBODIMENTS

Figure 1:
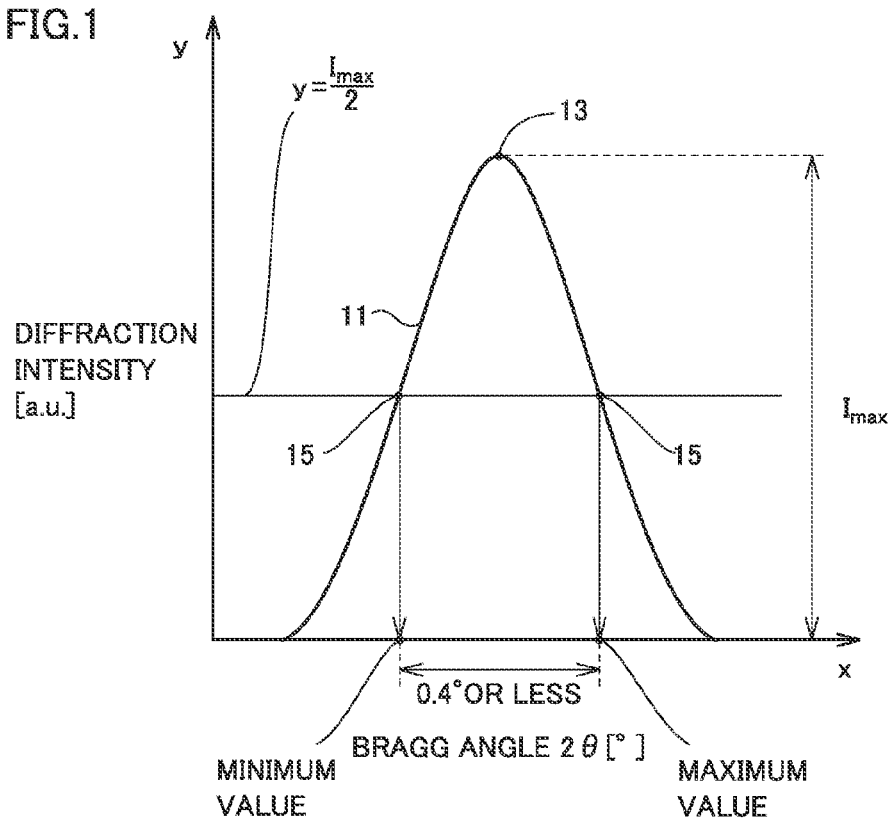
FIG. 1 is a schematic diagram showing an example of the shape of the first peak that appears in an X-ray diffraction spectrum of a composite sintered material.

It is said that the wear resistance of a tool is increased when TiC is used as a binder while the fracture resistance of the tool is increased when TiN is used as a binder. Accordingly, it can be expected that the tool can be improved in wear resistance and fracture resistance when this tool is manufactured using a composite sintered material manufactured using TiC and TiN as raw materials of a binder.

However, it turned out that boundary wear may occur in a boundary portion at an end cutting edge when hardened steel processing and the like are carried out using a tool manufactured with TiC and TiN as raw materials of a binder for the composite sintered material. When the tool undergoing boundary wear was examined in detail, it turned out that the binder includes a part having a nonuniform composition, and also that wear progresses from this part as a starting point. As a result of earnest studies in view of the above-described findings, the present inventors have achieved a conclusion as follows: Specifically, if the binder has a uniform composition, occurrence of boundary wear in a boundary portion at an end cutting edge can be prevented even when hardened steel processing and the like are carried out. Therefore, the processing accuracy can be improved. This conclusion will be hereinafter specifically explained Description of Embodiments of the Present Invention The embodiments of the present invention will be first listed for explanation.

[1] A composite sintered material according to one embodiment of the present invention contains cubic boron nitride particles and binder particles. The composite sintered material contains 40 vol % or more and 80 vol % or less of the cubic boron nitride particles. The binder particles contain TiCN particles. The composite sintered material shows a first peak belonging to a (200) plane of the TiCN particles in a range in which a Bragg angle 2θ is 41.7° or more and 42.6° or less in an X-ray diffraction spectrum measured using a Cu-Kα ray as a ray source. Assuming that a horizontal axis x in the X-ray diffraction spectrum indicates a Bragg angle 2θ, that a vertical axis y in the X-ray diffraction spectrum indicates diffraction intensity, and that a maximum value of a peak height of the first peak is defined as $I_{max}$, a difference between a maximum value and a minimum value of Bragg angles 2θ is 0.4° or less, the Bragg angles 2θ being measured at two or more intersection points of a straight line $y=I_{max}/2$ and the first peak. If hardened steel processing and the like are carried out using a tool including this composite sintered material, occurrence of boundary wear in a boundary portion at an end cutting edge can be prevented, so that processing accuracy can be improved. The expression that "processing accuracy can be improved" used herein means that a processed surface with low surface roughness (that is, a smooth processed surface) can be provided.

[2] In the X-ray diffraction spectrum, it is preferable that a peak height ratio ($I_{TiCN}/I_{cBN}$) of a peak height $I_{TiCN}$ of a peak belonging to the (200) plane of the TiCN particles to a peak height $I_{cBN}$ of a peak belonging to a (111) plane of the cubic boron nitride particles is 0.8 or more and 2.2 or less. Thereby, the strength of the composite sintered material can be increased. Also, the wear resistance of the composite sintered material can be improved.

[3] It is preferable that the composite sintered material contains 50 vol % or more and 60 vol % or less of the cubic boron nitride particles. It is preferable that the Bragg angle 2θ is 42.2° or more and 42.6° or less at the maximum value of the peak height of the first peak. Thereby, the composite sintered material is improved in balance between the wear resistance and the fracture resistance, so that the tool life can be stabilized.

[4] It is preferable that the binder particles have an average particle size of 50 nm or more and 200 nm or less. Thereby, the strength of the composite sintered material can be increased. Also, the composition of the TiCN particles is rendered further uniform.

[5] In a surface-coated boron nitride sintered material tool according to one embodiment of the present invention, at least a cutting edge portion includes: a composite sintered material containing cubic boron nitride particles and binder particles; and a coating layer provided on a surface of the composite sintered material. The composite sintered material is the composite sintered material according to one embodiment of the present invention. The coating layer includes an A layer and a B layer. The A layer is provided as an outermost surface of the coating layer or provided between the outermost surface of the coating layer and the B layer. A distance between the outermost surface of the coating layer and an upper surface of the B layer is 0.1 μm or more and 1.0 μm or less. The A layer is formed of $Ti_{1-s}Ma_sC_{1-t}N_t$ (where Ma indicates at least one element of Cr, Nb and W; 0≤s≤0.7; and 0≤t≤1). The B layer is formed of $Al_{1-x-y}Cr_xMc_yN$ (where Mc indicates at least one element of Ti, V and Si; 0≤y≤0.6; 0.2≤1−x−y≤0.8; and 0<x+y<1). Thus, since the surface-coated boron nitride sintered material tool according to one embodiment of the present invention includes a composite sintered material according to one embodiment of the present invention, the processing accuracy can be improved also in hardened steel processing and the like.

The "outermost surface of the coating layer" used herein means a surface of the coating layer that is located on the opposite side of the interface with the composite sintered material. The "upper surface of the B layer" means a surface of the B layer that is located on the outermost surface-side of the coating layer. The "distance between the outermost surface of the coating layer and an upper surface of the B layer" means the distance between the upper surface of the B layer and the outermost surface of the coating layer in the thickness direction of the coating layer. In the case where the coating layer includes two or more B layers, the "distance between the outermost surface of the coating layer and an upper surface of the B layer" means the distance between the outermost surface of the coating layer and the upper surface of the B layer located on the outermost surface-side of the coating layer in the thickness direction of the coating layer.

Details of Embodiments of the Present Invention

Embodiments of the present invention (hereinafter referred to as the "present embodiment") will be hereinafter described in greater detail.

<Configuration of Composite Sintered Material>

The composite sintered material of the present embodiment includes cBN particles and binder particles. Such a composite sintered material may include other components as long as it includes cBN particles and binder particles, and also can include inevitable impurities resulting from the raw materials, the manufacturing conditions, and the like. Furthermore, in the composite sintered material of the present embodiment, cBN particles may be connected to each other to form a continuous structure, or binder particles may be connected to each other to form a continuous structure.

The composite sintered material contains 40 vol % or more and 80 vol % or less of cBN particles (described later). Furthermore, the binder particles contain TiCN particles.

<X-Ray Diffraction Spectrum of Composite Sintered Material>

The composite sintered material has the first peak belonging to a (200) plane of the TiCN particles in a range in which a Bragg angle 2θ is 41.7° or more and 42.6° or less in an X-ray diffraction spectrum measured using a Cu-Kα ray (having a wave length of 1.54060 Å) as a ray source. Assuming that a horizontal axis x in the X-ray diffraction spectrum indicates a Bragg angle 2θ, that a vertical axis y in the X-ray diffraction spectrum indicates diffraction intensity, and that the maximum value of the peak height of the first peak is defined as $I_{max}$, the difference between the maximum value and the minimum value of Bragg angles 2θ (Δ2θ (°)) is 0.4° or less, the Bragg angles 2θ being measured at two or more intersection points of a straight line $y=I_{MAX}/2$ and the first peak.

Since the difference between the above-mentioned maximum value and the above-mentioned minimum value (Δ2θ (°)) is 0.4° or less, it can be expected that the composition of the TiCN particles is uniform. Thereby, even if hardened steel processing and the like are carried out using a tool including the composite sintered material of the present embodiment, wear can be prevented from progressing from a portion as a starting point where the composition of the binder particles is nonuniform. Accordingly, occurrence of boundary wear in the boundary portion at an end cutting edge can be prevented, so that the processing accuracy can be improved. The expression that "the composition of the binder particles is uniform" means that: the TiCN particles do not substantially contain TiC and TiN; the composition of TiCN particles is expressed by $TiC_zN_{1-z}$ (0<z<1); and the difference between the above-mentioned maximum value and the above-mentioned minimum value ($\Delta 2\theta$ (°)) is 0.4° or less.

It can be expected that the composition of TiCN particles is more uniform as the difference between the above-mentioned maximum value and the above-mentioned minimum value ($\Delta 2\theta$ (°)) is smaller. Accordingly, even in the case where hardened steel processing and the like are carried out using a tool including such a composite sintered material, occurrence of boundary wear in the boundary portion at the end cutting edge can be further prevented, so that the processing accuracy can be further improved. The difference between the above-mentioned maximum value and the above-mentioned minimum value ($\Delta 2\theta$ (°)) is preferably more than 0° and 0.4° or less.

In the present specification, the "peak" includes not only a peak having only one top point (the highest value) (a peak having a unimodal shape), but also a peak having n (n is an integer) top points and (n−1) valley portions (the lowest value) (a peak having a multi-modal shape).

Furthermore, the expression of having the "first peak belonging to a (200) plane of the TiCN particles in a range in which a Bragg angle 2θ is 41.7° or more and 42.6° or less" means that each of top points included in the first peak appears in a range in which the Bragg angle 2θ is 41.7° or more and 42.6° or less, and also includes the case where a part of the lower base portion of the first peak extends to a range in which Bragg angle 2θ is less than 41.7° or to a range in which the Bragg angle 2θ is larger than 42.6°.

The "peak height" means the magnitude of the diffraction intensity at the top point included in the peak, which will be hereinafter described in detail with reference to FIGS. 1 to 4. FIGS. 1 to 4 are schematic diagrams each showing an example of the shape of the first peak that appears in the X-ray diffraction spectrum of the composite sintered material.

In the case where a first peak 11 has a unimodal shape (FIG. 1), the "maximum value $I_{max}$ of the peak height of the first peak" means a peak height of a top point 13 (only one top point 13) included in first peak 11. Straight line $y=I_{max}/2$ and first peak 11 intersect at two intersection points 15. The larger one of Bragg angles 2θ at two intersection points 15 corresponds to the above-mentioned maximum value while the smaller one thereof corresponds to the above-mentioned minimum value.

Figure 2:
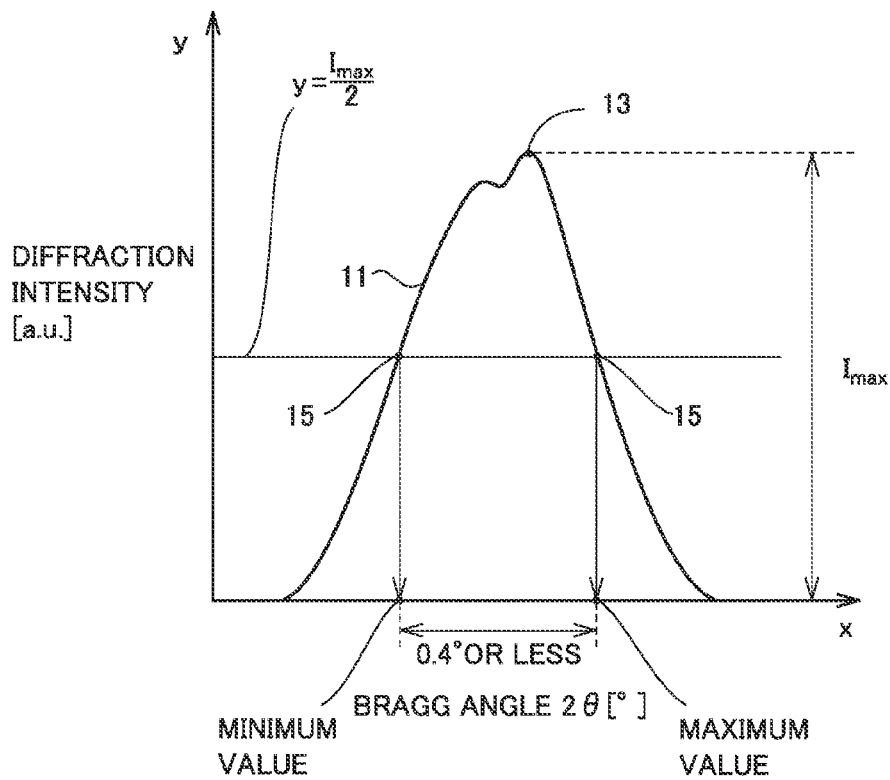
FIG. 2 is a schematic diagram showing an example of the shape of the first peak that appears in the X-ray diffraction spectrum of the composite sintered material.
Figure 3:
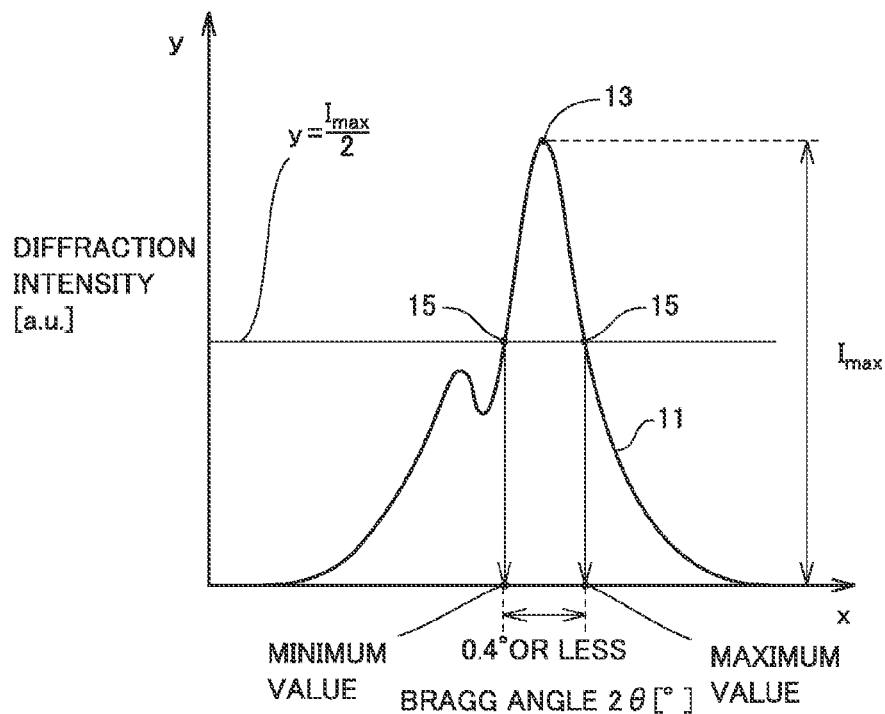
FIG. 3 is a schematic diagram showing an example of the shape of the first peak that appears in the X-ray diffraction spectrum of the composite sintered material.

In the case where first peak 11 has a multi-modal shape (FIGS. 2 to 4), "maximum value $I_{max}$ of the peak height of the first peak" means a peak height of the highest top point 13 among a plurality of top points included in first peak 11. In FIGS. 2 and 3, straight line $y=I_{max}/2$ and first peak 11 intersect at two intersection points 15. The larger one of Bragg angles 2θ at two intersection points 15 corresponds to the above-mentioned maximum value while the smaller one thereof corresponds to the above-mentioned minimum value.

Figure 4:
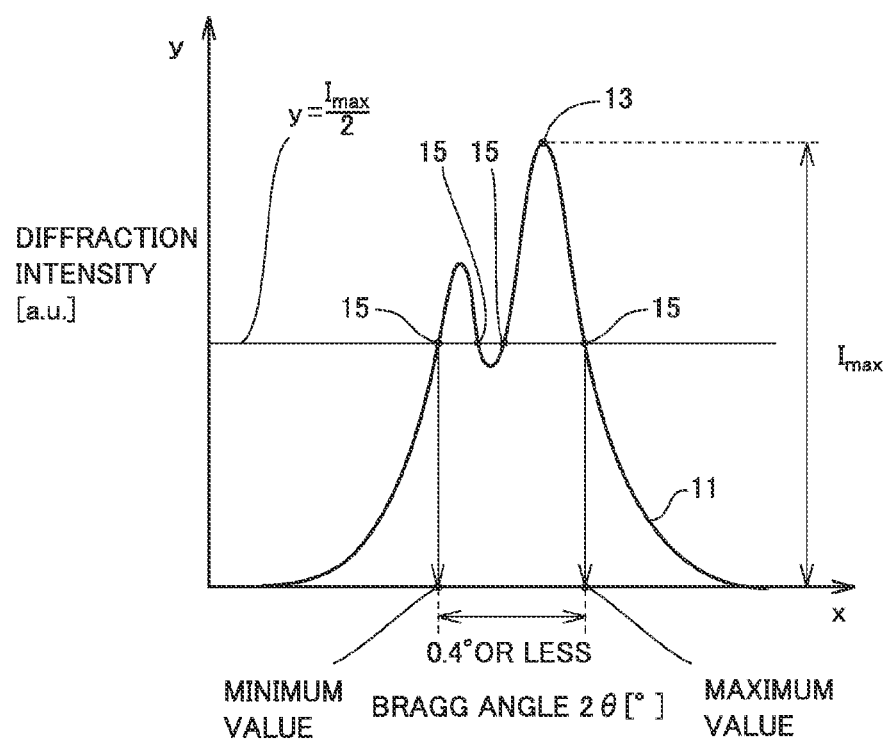
FIG. 4 is a schematic diagram showing an example of the shape of the first peak that appears in the X-ray diffraction spectrum of the composite sintered material.

In FIG. 4, straight line $y=I_{max}/2$ and first peak 11 intersect at four intersection points 15. The largest value of Bragg angles 2θ at four intersection points 15 corresponds to the above-mentioned maximum value while the smallest value thereof corresponds to the above-mentioned minimum value.

In the above-mentioned X-ray diffraction spectrum, it is preferable that Bragg angle 2θ is 42.2° or more and 42.6° or less at the maximum value of the peak height of the first peak. Thereby, the composite sintered material is improved in balance between the wear resistance and the fracture resistance, so that the tool life can be stabilized.

Furthermore, in the above-mentioned X-ray diffraction spectrum, it is preferable that a peak height ratio ($I_{TiCN}/I_{cBN}$) of a peak height $I_{TiCN}$ of the peak belonging to the (200) plane of the TiCN particles to a peak height $I_{cBN}$ of the peak belonging to the (111) plane of the cBN particles is 0.8 or more and 2.2 or less. Thereby, it is considered that the composite sintered material contains a suitable amount of the binder for firmly coupling cBN particles to one another. Therefore, since the strength of the composite sintered material can be increased, the fracture resistance of the composite sintered material can be increased. Furthermore, the wear resistance of the composite sintered material can be improved. In light of the above, the processing accuracy can be further improved even in the case where hardened steel processing and the like are carried out using a tool including such a composite sintered material. More preferably, the peak height ratio ($I_{TiCN}/I_{cBN}$) is 1.6 or more and 2.0 or less.

In the case where the peak belonging to the (200) plane of the TiCN particles has a multi-modal shape, "peak height $I_{TiCN}$ of the peak belonging to the (200) plane of the TiCN particles" means the peak height of the highest top point among a plurality of top points included in the peak.

In the present specification, the X-ray diffraction spectrum of the composite sintered material is measured using an X-ray diffractometer under the conditions as described below.

X-ray light source: Cu-Kα ray (having a wavelength of 1.54060 Å)
Scan step: 0.02°
Scan axis: 2θ
Scan range: 20° to 80°
Voltage: 40 kV
Current: 30 mA
Scan speed: 1°/min.

In the case where the value on the vertical axis in the lower base portion of the peak shows a positive value in the X-ray diffraction spectrum, the above-mentioned "peak height" means the peak height after a background correction. The method for this background correction can be a method that is conventionally known as a method for a background correction made to the X-ray diffraction spectrum. For example, a background correction may be made to the entire X-ray diffraction spectrum of the composite sintered material, or may be made only to a specific peak (for example, the peak belonging to the (111) plane of the cBN particles or the peak belonging to the (200) plane of TiCN particles).

<cBN Particle>

The composite sintered material includes 40 vol % or more and 80 vol % or less of cBN particles. If the composite sintered material includes 40 vol % or more of cBN particles, the strength of the composite sintered material can be increased, so that the fracture resistance of the composite sintered material can be increased. Therefore, the processing accuracy can be improved even in the case where hardened steel processing and the like are carried out. If the composite sintered material includes 80 vol % or less of cBN particles, the volume content of the binder particles in the composite sintered material can be ensured, so that the heat resistance of the composite sintered material is increased. Therefore, since reaction of the cBN particles can be prevented from being caused by heat produced by hardened steel processing and the like, the wear resistance of the composite sintered material is increased. Therefore, the processing accuracy can be improved even in the case where hardened steel processing and the like are carried out. Preferably, the composite sintered material includes 50 vol % or more and 60 vol % or less of cBN particles.

In the present specification, the volume content of the cBN particles in the composite sintered material is calculated in accordance with the method described below. The same also applies to Examples described later. First, the composite sintered material is mirror-polished, and a photograph of the backscattered electron image of the composite sintered material structure in an arbitrary region is taken by an electron microscope at 2000 times magnification. In this case, the cBN particles are observed as a black area while the binder particles are observed as a gray area or a white area. Then, the obtained photograph of the composite sintered material structure is subjected to image processing to achieve binarization of the cBN particles and the binder particles ("Win roof" can be used as image analysis software), to calculate the occupancy area of the cBN particles. Then, the calculated occupancy area of the cBN particles is substituted into the following equation, thereby obtaining the volume content of the cBN particles in the composite sintered material.

(Volume content of cBN particles in composite sintered material)=(occupancy area of cBN particles)÷(entire area of photographed composite sintered material structure)×100.

<Binder Particle>

Binder particles are not particularly limited as long as they exhibit an action of coupling cBN particles to one another, and any binder particle having a conventionally known composition that is known as a binder particle of the composite sintered material can be employed. It is preferable that the binder particle is, for example; a particle made of a compound containing at least one element of group 4 elements (Ti, Zn, Hf or the like), group 5 elements (V, Nb, Ta or the like) and group 6 elements (Cr, Mo, W or the like) in the element periodic table, and at least one element of C, N, B, and O; a particle made of a solid solution of such a compound; or a particle made of an aluminum compound. The binder particle may be a particle made of two or more of: the above-described compound; a solid solution of the above-described compound; and an aluminum compound. In the present embodiment, the binder particles contain TiCN particles (as described above).

It is preferable that the binder particles have an average particle size of 50 nm or more and 200 nm or less. If the binder particles have an average particle size of 50 nm or more, the bonding strength of the cBN particles by the binder particles can be ensured, so that the strength of the composite sintered material can be enhanced. Therefore, since the fracture resistance of the composite sintered material can be increased, the processing accuracy can be further improved even in the case where hardened steel processing and the like are carried out. If the binder particles have an average particle size of 200 nm or less, the composition of TiCN particles is readily rendered further uniform in the binder particles. Accordingly, even in the case where hardened steel processing and the like are carried out using a tool including such a composite sintered material, wear can be readily prevented from progressing from a portion as a starting point where the composition of the binder particles is nonuniform. Therefore, occurrence of boundary wear in the boundary portion at the end cutting edge can be readily prevented, so that the processing accuracy can be further improved. More preferably, the binder particles have an average particle size of 100 nm or more and 150 nm or less.

In the present specification, the average particle size of the binder particles is calculated in accordance with the method as described below. First, a focused ion beam system (FIB), a cross section polisher (CP) or the like is used to produce an observation sample. The entire observation sample is observed by using a scanning electron microscope (SEM) at 500 times magnification. Then, a view (region) where binder particles are averagely dispersed is selected, and this region is further observed at 50000 times magnification.

Then, the SEM image of the selected region is subjected to image processing to achieve binarization of the cBN particles and the binder particles. In addition, in the above-described SEM image, the cBN particles are observed as a black area while the binder particles are observed as a gray area or a white area.

Then, image analysis software is used to calculate a circle equivalent diameter (a diameter of the circle in the case where the shape of the binder particle is assumed to be a circle having this area) based on the area per binder particle. The average value of the calculated circle equivalent diameters is defined as an average particle size of the binder particles.

<Use of Composite Sintered Material>

The composite sintered material of the present embodiment can be used for various types of tools including a cutting tool and also be useful as various types of industrial materials. The effects of the present embodiment are effectively exhibited particularly in the case of using a cutting tool, at least a part of which includes the composite sintered material of the present embodiment.

Examples of such a cutting tool can be a drill, an end mill, a cutting edge replaceable-type cutting tip for a drill, a cutting edge replaceable-type cutting tip for an end mill, a cutting edge replaceable-type cutting tip for milling, a cutting edge replaceable-type cutting tip for turning, a metal saw, a gear cutting tool, a reamer, a tap, a pin-milling processing tip of a crankshaft, and the like.

The composite sintered material of the present embodiment, which is used for a cutting tool as described above, is not limited only to the case where this composite sintered material constitutes the entire configuration of the tool, but also includes the case where this composite sintered material constitutes only a part of the tool (particularly, a cutting edge part and the like), and for example may include the case where only the cutting edge part of the base member made of cemented carbide or the like is formed of a composite sintered material of the present embodiment.

<Manufacture of Composite Sintered Material>

Figure 5:
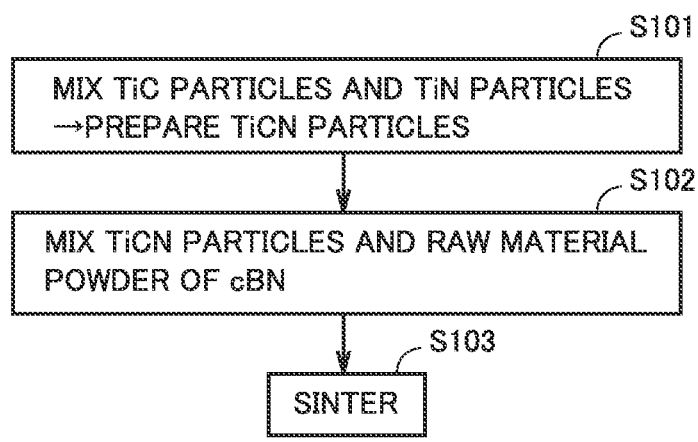
FIG. 5 is a flow illustrating a method of manufacturing a composite sintered material according to one embodiment of the present invention.
Figure 6:
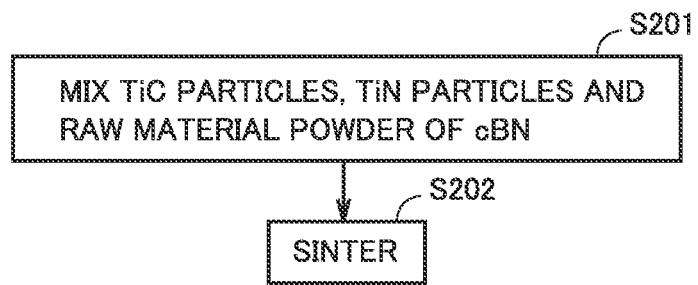
FIG. 6 is a flow illustrating a method of manufacturing a conventional composite sintered material.

FIG. 5 is a flow illustrating a method of manufacturing a composite sintered material according to the present embodiment. FIG. 6 is a flow illustrating a method of manufacturing a conventional composite sintered material.

The method of manufacturing a composite sintered material of the present embodiment includes: step S101 of preparing TiCN particles; step S102 of mixing TiCN particles and raw material powder of cBN; and sintering step S103.

<Preparation of TiCN Particles>

In step S101 of preparing TiCN particles, TiC particles and TiN particles are uniformly mixed, and then, the obtained mixture is subjected to a heat treatment. Thereby, TiCN particles are obtained.

The TiC particles and the TiN particles can be uniformly mixed, for example, using a ball mill or the like. After the heat treatment, the TiCN particles are ground using a carbide ball mill, thereby obtaining fine-grained powder of TiCN particles.

<Mixing of TiCN Particles and Raw Material Powder of cBN>

In step S102 of mixing TiCN particles and raw material powder of cBN, the prepared TiCN particles and the raw material powder of cBN are uniformly mixed. Then, the obtained mixture is formed into a desired shape to thereby obtain a compact. The conditions for mixing TiCN particles and raw material powder of cBN can be a condition that is conventionally known as a condition for mixing binder particles and raw material powder of cBN. The same applies to the method of obtaining a compact (forming method).

<Sintering>

In sintering step S103, after a heat treatment for a certain time period in a vacuum furnace, the obtained compact is sintered. The sintering condition may be, for example, a condition that the obtained compact is held at a temperature of about 1100° C. to 2000° C. at a pressure of about 3 GPa to 10 GPa for about 10 to 120 minutes.

Conventionally, in the case where a composite sintered material containing TiC and TiN is manufactured as a binder (FIG. 6), the raw material powder of cBN, the TiC particles and the TiN particles are uniformly mixed (S201), which is then subjected to a heat treatment for a certain time period in a vacuum furnace, and then, sintered (S202). The composite sintered material manufactured in this way contains not only TiCN particles but also TiC particles or TiN particles, with the result that the composition of the binder tends to be nonuniform in the composite sintered material. Accordingly, when hardened steel processing and the like are carried out using a tool including this manufactured composite sintered material, wear progresses from a portion as a starting point where the composition of the binder is nonuniform. Thereby, boundary wear occurs in a boundary portion at the end cutting edge. This results in a decrease in processing accuracy.

However, the method of manufacturing a composite sintered material of the present embodiment includes a step of uniformly mixing TiC particles and TiN particles to prepare TiCN particles (S101), so that a binder having a uniform composition can be obtained. Thereby, a composite sintered material including a binder containing TiCN particles having a uniform composition can be obtained. Therefore, even in the case where hardened steel processing and the like are carried out using a tool including the manufactured composite sintered material, boundary wear can be prevented from occurring in a boundary portion at the end cutting edge, so that the processing accuracy can be improved.

<Configuration of Surface-Coated Boron Nitride Sintered Material Tool>

In the surface-coated boron nitride sintered material tool of the present embodiment, at least a cutting edge portion includes: a composite sintered material of the present embodiment; and a coating layer provided on the surface of the composite sintered material. In this way, the surface-coated boron nitride sintered material tool of the present embodiment includes a composite sintered material of the present embodiment. Accordingly, even in the case where hardened steel processing and the like are carried out using the surface-coated boron nitride sintered material tool of the present embodiment, occurrence of boundary wear in the boundary portion at the end cutting edge can be prevented. Therefore, the processing accuracy can be improved even in hardened steel processing and the like.

In addition to the above, the surface-coated boron nitride sintered material tool of the present embodiment includes a coating layer described later, so that the wear resistance of the surface-coated boron nitride sintered material tool can be increased. Therefore, the processing accuracy can be further improved in hardened steel processing and the like.

The surface-coated boron nitride sintered material tool having such a basic configuration can be used particularly effectively in machining (for example, cutting processing) of a sintered alloy and hard-to-cut cast iron or in processing of hardened steel, and also can be suitably used in various types of commonly-used metal processing other than the above.

<Coating Layer>

Preferably, the coating layer includes an A layer and a B layer. Preferably, the A layer is provided as the outermost surface of the coating layer or provided between the outermost surface of the coating layer and the B layer. Also, the distance between the outermost surface of the coating layer and the upper surface of the B layer is 0.1 μm or more and 1.0 μm or less. The coating layer of the present embodiment may include any other layers (for example, a C layer in Example described later) in addition to the A layer and the B layer as long as it includes these A and B layers. Such other layers may be provided between the composite sintered material and the B layer, provided between the A layer and the B layer, or provided above the A layer. Furthermore, the coating layer of the present embodiment may include A layers and B layers that are alternately stacked.

In the present specification, the thickness of the A layer and the number of stacked A layers, and the thickness of the B layer and the number of stacked B layers each were obtained by observing a cross section of the surface-coated boron nitride sintered material tool, which has been cut, with an SEM or a transmission electron microscope (TEM). Furthermore, the composition of each of the A layer and the B layer was measured using an energy dispersive X-ray spectrometry attached to the SEM or the TEM.

Although the coating layer only has to be provided only in the cutting edge portion of the surface-coated boron nitride sintered material tool, it may cover the entire surface of the base member of the surface-coated boron nitride sintered material tool, or may not be provided in a part of the portion different from the cutting edge portion. Furthermore, the stacking configuration of a part of the coating layer may be partially different in a portion different from the cutting edge portion.

<A Layer>

Preferably, the A layer is provided above the B layer, and is formed of $Ti_{1-s}Ma_sC_{1-t}N_t$ (where Ma indicates at least one element of Cr, Nb and W; $0 \leq s \leq 0.7$; and $0 < t \leq 1$). Such an A layer smoothly wears out while slowing progress of crater wear and flank face wear. The A layer is arranged on the B layer, so that undulations can be suppressed from occurring due to progress of crater wear and flank face wear. As the A layer and the B layer synergistically act, the wear resistance in a region extending from the outermost surface of the coating layer to the B layer can also be increased. Therefore, even in the case where hardened steel processing and the like are carried out using the surface-coated boron nitride sintered material tool of the present embodiment, occurrence of boundary wear in the boundary portion at the end cutting edge can be further prevented, so that the processing accuracy can be further improved. It is more preferable that $0 \leq s \leq 0.3$ and $0 < t \leq 0.7$.

The expression that the "A layer is formed of $Ti_{1-s}Ma_sC_{1-t}N_t$ (where Ma indicates at least one element of Cr, Nb and W; $0 \leq s \leq 0.7$; and $0 < t \leq 1$)" also includes the case where a part of the A layer in the thickness direction thereof is formed of $Ti_{1-s}Ma_sC_{1-t}N_t$ (where Ma indicates at least one element of Cr, Nb and W; $0 \leq s \leq 0.7$; and $0 < t \leq 1$).

A composition s of Ma or a composition t of N may be uniform in the A layer, or may increase or decrease in a step-like manner or in a slope-like manner from the composite sintered material-side toward the surface-side of the A layer (for example, toward the outermost surface-side of the coating layer).

Preferably, the A layer has a thickness of 0.35 μm or more and 0.7 μm or less. If the thickness of the A layer is 0.35 μm or more, undulations caused by progress of crater wear and flank face wear can be further suppressed. Accordingly, if hardened steel processing and the like are carried out using such a surface-coated boron nitride sintered material tool, occurrence of boundary wear in the boundary portion at the end cutting edge can be further prevented, so that the processing accuracy can be further improved. If the thickness of the A layer is 0.7 μm or less, progress of flank face wear and progress of boundary wear can be well-balanced, so that the processing accuracy can be highly maintained. More preferably, the thickness of the A layer is 0.35 μm or more and 0.5 μm or less.

<B Layer>

Preferably, the B layer is formed of $Al_{1-x-y}Cr_xMc_yN$ (where Mc indicates at least one element of Ti, V and Si; $0 \leq y \leq 0.6$; $0.2 \leq 1-x-y \leq 0.8$; and $0 < x+y < 1$). Thereby, occurrence of boundary wear in the boundary portion at the end cutting edge can be further prevented. Furthermore, since the distance between the outermost surface of the coating layer and the upper surface of the B layer is 0.1 μm or more and 1.0 μm or less, the maximum length of the above-mentioned boundary wear in the early stage of cutting can be limited to a specific value or less. The shape of boundary wear exerts a direct influence upon the surface roughness in the processed surface of the workpiece. Therefore, limiting of the maximum length of the boundary wear to a specific value or less as described above specifically means that the degree of the surface roughness in the processed surface of the workpiece can be limited to a specific value or less. Accordingly, if hardened steel processing and the like are carried out using such a surface-coated boron nitride sintered material tool, occurrence of boundary wear in the boundary portion at the end cutting edge can be further prevented, so that the processing accuracy can be further improved. It is more preferable that $0 \leq y \leq 0.2$, $0.3 \leq 1-x-y \leq 0.7$, and $0.2 \leq x+y \leq 0.7$.

A composition x of Cr or a composition y of Mc may be uniform in the B layer, or may increase or decrease in a step-like manner or in a slope-like manner from the composite sintered material-side toward the surface-side of the B layer (for example, toward the A layer-side).

Preferably, the thickness of the B layer is 0.1 μm or more and 1.0 μm or less. If the thickness of the B layer is 0.1 μm or more, occurrence of boundary wear in the boundary portion at the end cutting edge can be further prevented. Accordingly, if hardened steel processing and the like are carried out using such a surface-coated boron nitride sintered material tool, occurrence of boundary wear in the boundary portion at the end cutting edge can be further prevented, so that the processing accuracy can be further improved. If the thickness of the B layer is 1.0 μm or less, progress of flank face wear and progress of boundary wear can be well-balanced, so that the processing accuracy can be highly maintained. More preferably, the thickness of the B layer is 0.1 μm or more and 0.5 μm or less.

<Manufacture of Surface-Coated Boron Nitride Sintered Material Tool>

The method of manufacturing a surface-coated boron nitride sintered material tool of the present embodiment includes, for example, the steps of: preparing a base member having a composite sintered material provided at least in a cutting edge portion; and forming a coating layer at least on a surface of the composite sintered material. The step of preparing a base member preferably includes the step of manufacturing a composite sintered material of the present embodiment, and more preferably, further includes the step of bonding the composite sintered material to a base member main body having a prescribed shape.

It is preferable that the step of forming a coating layer includes the step of forming a coating layer by the arc ion plating method (the ion plating method for evaporating a solid material by utilizing vacuum arc discharge) or by the sputtering method.

According to the arc ion plating method, a coating layer can be formed using: a metal evaporation source containing metal species for forming a coating layer; and reaction gas such as $CH_4$, $N_2$, $O_2$ or the like. The conditions for forming a coating layer by the arc ion plating method can be those known as conditions for forming a coating layer of the surface-coated boron nitride sintered material tool by the arc ion plating method.

According to the sputtering method, a coating layer can be formed using: a metal evaporation source containing metal species for forming a coating layer; reaction gas such as $CH_4$, $N_2$, $O_2$ or the like; and sputtering gas such as Ar, Kr, Xe, or the like. The conditions for forming a coating layer by the sputtering method can be those known as conditions for forming a coating layer of the surface-coated boron nitride sintered material tool by the sputtering method.

More preferably, the method of manufacturing a surface-coated boron nitride sintered material tool of the present embodiment includes the step of, before the step of forming a coating layer, etching the surface of the base member on which a coating layer is to be formed. By this etching, only the binder of the composite sintered material included in the above-described surface of the base member is selectively removed. Therefore, by the anchoring effect, and also by the adhesiveness between the Al compound in the binder and the coating layer that is stronger than the adhesiveness between the cBN particles and the coating layer, the adhesiveness between the binder and the coating layer is strengthened.

EXAMPLES

Although the present invention will be hereinafter described in greater detail with reference to Examples, the present invention is not limited thereto.

Examples 1 to 3 and Comparative Examples 1 and 2

<Manufacture of Composite Sintered Material>

First, a ball mill formed of a pot made of cemented carbide and a ball made of cemented carbide was used to uniformly mix TiC particles and TiN particles in a molar ratio of 1:1. The obtained mixture was subjected to a heat treatment at 1300° C. in a vacuum furnace, thereby performing a uniforming process. The uniformed mixture was ground by the pot made of cemented carbide and the ball made of cemented carbide, thereby obtaining TiCN particles.

Then, the raw material powder of cBN and the TiCN particles were uniformly mixed by the above-described ball mill such that the blending proportion of the raw material powder of cBN became equal to the value shown in Table 1. Then, the obtained powder mixture was held for 20 minutes at 900° C. in the vacuum furnace, and thereby degassed. The degassed powder mixture was introduced into a capsule made of cemented carbide.

Then, the ultra-high pressure apparatus was used to again apply pressure to the powder mixture introduced into a capsule up to 6.0 GPa and simultaneously raise the temperature to 1400° C., and then, held for further 15 minutes under such pressure and temperature conditions, thereby performing sintering. In this way, a composite sintered material was obtained. The obtained composite sintered material was then subjected to measurements as described below.

<Measurement of X-Ray Diffraction Spectrum>

First, an X-ray diffractometer was used to measure the X-ray diffraction spectrum of the composite sintered material under the conditions as described below, and then identify the compounds including binder particles.

X-ray light source: Cu-Kα ray (having a wavelength of 1.54060 Å)
Scan step: 0.02°
Scan axis: 2θ
Scan area: 20° to 80°.
Voltage: 40 kV
Current: 30 mA
Scan speed: 1°/min.

Then, the obtained X-ray diffraction spectrum was entirely subjected to a background correction, and a straight line $y=I_{max}/2$ was drawn on the X-ray diffraction spectrum that has been subjected to a background correction. Then, the difference between the maximum value and the minimum value of Bragg angles 2θ (Δ2θ (°)) at two or more intersection points of straight line $y=I_{max}/2$ and the first peak was calculated.

Furthermore, the X-ray diffraction spectrum having been subjected to a background correction was used to calculate a peak height ratio ($I_{TiCN}/I_{cBN}$).

<Measurement of Average Particle Size of Binder Particles>

First, an observation sample was produced using CP. The entire observation sample was observed by using an SEM (manufactured by JEOL Ltd.; product number "JSM7600F") at 500 times magnification under the observation conditions as described below. The region where binder particles were averagely dispersed was selected and observed at 50000 times magnification. A backscattered electron detector (LABE) was used as a detector.

<Observation Conditions>
Accelerating voltage: 2 kV
Aperture: 6 μm
Observation mode: GB mode (Gentle Beam mode).

Then, the SEM image in the selected region was subjected to image processing to thereby achieve binarization of the cBN particles (a black area) and the binder particles (a gray area or a white area).

Then, image analysis software (Win roof) was used to calculate a circle equivalent diameter based on the area per binder particle. The average value of the calculated circle equivalent diameters was defined as an average particle size of the binder particles.

<Measurement of Average Particle Size of cBN Particles>

The average particle size of cBN particles was calculated in accordance with the same method as that of the above-described <Measurement of Average Particle Size of Binder Particles>.

<Measurement of Continuous Cutting Life>

The manufactured composite sintered material was brazed to a base member made of cemented carbide and molded into a prescribed shape (DNGA150408 S01225 of the ISO standard). In this way, a sample for measurement of continuous cutting life was obtained.

The obtained sample was used to perform a cutting test of performing high-speed continuous cutting under the following conditions, to obtain the tool life (continuous cutting life) until the ten-point average roughness Rz of the workpiece after cutting reached 3.2 μm or more, or until the flank face maximum wear reached 0.1 mm or more. The width of flank face wear allows evaluation of deterioration of the dimensional accuracy resulting from an increase in undulation component of the processed surface due to an increase in cutting resistance. Furthermore, the ten-point average roughness of the processed surface allows evaluation of progress of boundary wear.

Work material: carburized and hardened steel SCM415H, HRC62
(100 mm in diameter×300 mm in length)
Cutting speed: V=200 m/min.
Feed rate: f=0.1 mm/rev.
Cutting depth: d=0.2 mm
Wet type/dry type: wet type.

The results thereof are shown in Table 1. The longer continuous cutting life means that the processing accuracy can be more improved even when hardened steel processing or the like is performed. In the present embodiment, it is considered that, if the continuous cutting life is 8 km or more, the processing accuracy is improved even when hardened steel processing or the like is performed.

<Measurement of Interrupted Cutting Life>

The manufactured composite sintered material was brazed to a base member made of cemented carbide and molded into a prescribed shape (DNGA150408 S01225 of the ISO standard). In this way, a sample for measurement of interrupted cutting life was obtained.

The obtained sample was used to perform a cutting test of performing high-speed strong interrupted cutting under the following conditions, to obtain the tool life (interrupted cutting life) until a breakage occurred. Interrupted cutting allows evaluation that a cutting edge is chipped by impacts upon the interrupted portion after progress of crater wear.

Work material: carburized and hardened steel SCM415-5V, HRC62
(100 mm in diameter×300 mm in length, five V-shaped grooves provided in the axial direction of the work material)
Cutting speed: V=130 m/min.
Feed rate: f=0.1 mm/rev.
Cutting depth: ap=0.2 mm
Wet type/dry type: dry type.

The results thereof are shown in Table 1. The longer interrupted cutting life means that the strength of the cutting edge is relatively high, the chipping resistance is excellent, and the processing accuracy can be improved, even when hardened steel processing or the like is performed. In the present embodiment, it is considered that, if the interrupted cutting life is 15 minutes or more, the processing accuracy is improved even when hardened steel processing or the like is performed.

Examples 4 and 5

The composite sintered material was manufactured in accordance with the method described in the above Example 1 and the like except that the average particle size of cBN particles was equal to a value shown in Table 1. The continuous cutting life and the interrupted cutting life were measured using the manufactured composite sintered material.

Comparative Examples 3 and 4

In Comparative Example 3, the composite sintered material was manufactured in accordance with the method described in the above Example 1 and the like except that commercially available TiCN particles (a trade name "TiCN (50:50)" manufactured by Japan New Metals Co., Ltd.) in place of preparing TiCN particles. The continuous cutting life and the interrupted cutting life were measured using the manufactured composite sintered material.

In Comparative Example 4, raw material powder of cBN, TiC particles and TiN particles were uniformly mixed in place of mixing the raw material powder of cBN with the TiCN particles obtained by mixing TiC particles and TiN particles. Except for the above, the composite sintered material was manufactured in accordance with the method described in the above Example 1 and the like. The continuous cutting life and the interrupted cutting life were measured using the manufactured composite sintered material.

Examples 6 to 8

In Example 6, the composite sintered material was manufactured in accordance with the method described in the above Example 1 and the like except that TiC particles and TiN particles were uniformly mixed in a molar ratio of 4:1 to obtain TiCN particles. The manufactured composite sintered material was used to measure the continuous cutting life and the interrupted cutting life.

In Example 7, the composite sintered material was manufactured in accordance with the method described in the above Example 1 and the like except that TiC particles and TiN particles were uniformly mixed in a molar ratio of 3:7 to obtain TiCN particles. The manufactured composite sintered material was used to measure the continuous cutting life and the interrupted cutting life.

In Example 8, the composite sintered material was manufactured in accordance with the method described in the above Example 1 and the like except that TiC particles and TiN particles were uniformly mixed in a molar ratio of 1:4 to obtain TiCN particles. The manufactured composite sintered material was used to measure the continuous cutting life and the interrupted cutting life.

Examples 9 and 10

The composite sintered material was manufactured in accordance with the method described in the above Example 1 and the like except that the average particle size of binder particles was equal to a value shown in Table 1. The manufactured composite sintered material was used to measure the continuous cutting life and the interrupted cutting life.

<Results and Consideration>

TABLE 1

| | | Compound Sintered Body | | | | | | | | |
|---|---|---|---|---|---|---|---|---|---|---|
| | | cBN Particle | | Binder Particle | | | | | Con- tinuous Cutting Life (km) | Inter- rupted Cutting Life (Minute) |
| | No. | Volume Content (Vol %) | Average Particle Size (μm) | Average Particle Size (nm) | Com- position | Δ2θ (°)*11 | Position of First Peak (°)*12 | Peak Height Ratio ($I_{TiCN}/I_{cBN}$) | Method of Manufacturing Compound Sintered Body*13 | |
| Example | 1 | 40 | 3 | 110 | $TiC_{0.5}N_{0.5}$ | 0.34 | 42.15 | 1.8 | TiC + TiN→TiCN TiCN + cBN | 10 | 22 |
| | 2 | 50 | 3 | 110 | $TiC_{0.5}N_{0.5}$ | 0.33 | 42.14 | 1.8 | TiC + TiN→TiCN TiCN + cBN | 12 | 25 |
| | 3 | 80 | 3 | 100 | $TiC_{0.5}N_{0.5}$ | 0.36 | 42.10 | 0.8 | TiC + TiN→TiCN TiCN + cBN | 8 | 30 |
| Comparative Example | 1 | 30 | 3 | 110 | $TiC_{0.5}N_{0.5}$ | 0.36 | 42.12 | 1.9 | TiC + TiN→TiCN TiCN + cBN | 8 | 5 |
| | 2 | 90 | 3 | 100 | $TiC_{0.5}N_{0.5}$ | 0.38 | 42.01 | 0.7 | TiC + TiN→TiCN TiCN + cBN | 3 | 10 |
| Example | 4 | 50 | 1 | 120 | $TiC_{0.5}N_{0.5}$ | 0.35 | 42.13 | 2.4 | TiC + TiN→TiCN TiCN + cBN | 11 | 18 |
| | 2 | 50 | 3 | 110 | $TiC_{0.5}N_{0.5}$ | 0.33 | 42.14 | 1.8 | TiC + TiN→TiCN TiCN + cBN | 12 | 25 |
| | 5 | 50 | 4 | 100 | $TiC_{0.5}N_{0.5}$ | 0.34 | 42.10 | 1.4 | TiC + TiN→TiCN TiCN + cBN | 9 | 22 |
| Example | 2 | 50 | 3 | 110 | $TiC_{0.5}N_{0.5}$ | 0.33 | 42.14 | 1.8 | TiC + TiN→TiCN TiCN + cBN | 12 | 25 |
| Comparative Example | 3 | 50 | 3 | 100 | $TiC_{0.5}N_{0.5}$ | 0.53 | 42.11 | 1.6 | Commercially Available TiCN + cBN | 4 | 18 |
| | 4 | 50 | 3 | 130 | $TiC_{0.5}N_{0.5}$ | 0.78 | 42.16 | 2 | TiC + TiN + cBN | 2 | 18 |
| Example | 6 | 50 | 3 | 130 | $TiC_{0.8}N_{0.2}$ | 0.37 | 41.90 | 2.1 | TiC + TiN→TiCN TiCN + cBN | 13 | 16 |
| | 2 | 50 | 3 | 110 | $TiC_{0.5}N_{0.5}$ | 0.33 | 42.14 | 1.8 | TiC + TiN→TiCN TiCN + cBN | 12 | 25 |
| | 7 | 50 | 3 | 100 | $TiC_{0.3}N_{0.7}$ | 0.34 | 42.35 | 1.8 | TiC + TiN→TiCN TiCN + cBN | 11 | 28 |
| | 8 | 50 | 3 | 80 | $TiC_{0.2}N_{0.8}$ | 0.35 | 42.40 | 1.6 | TiC + TiN→TiCN TiCN + cBN | 9 | 25 |
| Example | 9 | 50 | 3 | 40 | $TiC_{0.5}N_{0.5}$ | 0.34 | 42.12 | 1.9 | TiC + TiN→TiCN TiCN + cBN | 10 | 20 |
| | 2 | 50 | 3 | 110 | $TiC_{0.5}N_{0.5}$ | 0.33 | 42.14 | 1.8 | TiC + TiN→TiCN TiCN + cBN | 12 | 25 |
| | 10 | 50 | 3 | 250 | $TiC_{0.5}N_{0.5}$ | 0.36 | 42.10 | 1.6 | TiC + TiN→TiCN TiCN + cBN | 8 | 18 |

In Table 1, the column of "Δ2θ (°)*11" shows the difference (°) between the maximum value and the minimum value of Bragg angles 2θ at two or more intersection points of straight line $y = I_{max}/2$ and the first peak in the X-ray diffraction spectrum of the composite sintered material.

Furthermore, in Table 1, the column of "Position of First Peak (°)*12" shows a value of Bragg angle 2θ at the top point of the first peak.

Furthermore, in the column of "Method of Manufacturing of Composite Sintered Material*[13]" in Table 1, "TiC+TiN→TiCN" means that TiC particles and TiN particles are uniformly mixed to obtain TiCN particles. "TiCN+cBN" means that the TiCN particles obtained by uniformly mixing TiC particles and TiN particles are mixed with raw material powder of cBN. Furthermore, "commercially available TiCN+cBN" means that commercially available TiCN particles and raw material powder of cBN are mixed. Furthermore, "TiC+TiN+cBN" means that TiC particles, TiN particles, and raw material powder of cBN are mixed.

In each of Examples 1 to 3, the continuous cutting life was 8 km or more, and the interrupted cutting life was 15 minutes or more. On the other hand, in Comparative Example 1, the interrupted cutting life was less than 15 minutes. In Comparative Example 2, the continuous cutting life was less than 8 km, and the interrupted cutting life was less than 15 minutes. It turned out from the above-described results that, if the composite sintered material contains 40 vol % or more and 80 vol % or less of cBN particles, the processing accuracy can be improved even in the case where hardened steel processing and the like are carried out.

In each of Examples 2, 4 and 5, the continuous cutting life was 8 km or more, and the interrupted cutting life was 15 minutes or more. Therefore, it turned out that, in the case where hardened steel processing and the like are carried out, the processing accuracy in hardened steel processing and the like can be improved irrespective of the particle size of the raw material powder of cBN.

In Example 2, the continuous cutting life was 8 km or more, and the interrupted cutting life was 15 minutes or more. On the other hand, in each of Comparative Examples 3 and 4, the interrupted cutting life was less than 8 km. It turned out from the above-described results that, if the difference between the maximum value and the minimum value ($\Delta 2\theta$ (°)) in the X-ray diffraction spectrum of the composite sintered material is 0.4° or less, the processing accuracy can still be improved even in the case where hardened steel processing and the like are carried out. It also turned out that, if the composite sintered material is manufactured using TiCN particles obtained by mixing TiC particles and TiN particles, the difference between the maximum value and the minimum value ($\Delta 2\theta$ (°)) in the X-ray diffraction spectrum of the composite sintered material is 0.4° or less.

In each of Examples 2, and 6 to 8, the continuous cutting life was 8 km or more, and the interrupted cutting life was 15 minutes or more. Therefore, it turned out that the processing accuracy in hardened steel processing and the like can be improved irrespective of the composition of the TiCN particles (for example, irrespective of the value of composition z of N in the case where the TiCN particles are expressed by $TiC_{1-z}N_z$).

In each of Examples 2, 9 and 10, the continuous cutting life was 8 km or more, and the interrupted cutting life was 15 minutes or more. However, in Example 2, the continuous cutting life and the interrupted cutting life were relatively long as compared with Examples 9 and 10. It turned out from the above-described results that, if the average particle size of binder particles is greater than 40 nm and less than 250 nm, the processing accuracy can be further improved even when hardened steel processing and the like are carried out.

Example 11

<Manufacture of Base Member>

The composite sintered material in the above Example 2 was brazed to a base member made of cemented carbide and molded into a prescribed shape (SNGA120408 of the ISO standard). In this way, the base member having a cutting edge portion formed of a composite sintered material was obtained.

<Etching to Surface of Base Member on which Coating Layer is to be Formed>

The above-described surface of the base member was subjected to etching within a film forming apparatus. A vacuum pump is connected to the film forming apparatus, within which a vacuum chamber that can be evacuated is provided. A rotary table is placed inside the vacuum chamber. This rotary table is configured such that the base member can be placed thereon through a jig. The base member placed within the vacuum chamber can be heated by a heater placed inside the vacuum chamber. Also, a gas pipe for introducing gas for etching and film forming is connected to the vacuum chamber through a mass flow controller (MFC) for flow rate control. Furthermore, within the vacuum chamber, a tungsten filament for generating Ar ions for etching is disposed, and an arc evaporation source or a sputtering source for film formation to which a necessary power supply is connected is disposed. Then, evaporation source raw material (target) required for film formation is placed in the arc evaporation source or the sputtering source.

The manufactured base member was placed within the above-described vacuum chamber of the above-described film forming apparatus, and the vacuum chamber was evacuated. Then, the base member was heated to 500° C. while rotating the rotary table at 3 rpm. Then, Ar gas was introduced into the vacuum chamber, the above-mentioned tungsten filament was discharged to generate Ar ions, a bias voltage was applied to the base member, and then, the surface of the base member (the surface of the base member on which a coating layer was to be formed) was etched by Ar ions.

The etching conditions in this case were as described below.

Pressure of Ar gas: 1 Pa
Substrate bias voltage: −500V.

<Formation of Coating Layer>

Within the above-mentioned film forming apparatus, a C layer, a B layer, a C layer, an A layer, a C layer, a B layer, a C layer, an A layer, a C layer, and a B layer were sequentially formed on the surface of the base member. The specific conditions for forming each layer were as described below. The manufactured surface-coated boron nitride sintered material tool (which may be hereinafter referred to as a "cutting tool") was used to measure the continuous cutting life.

<Formation of C Layer>

Within the above-described film forming apparatus, C1 layers and C2 layers were alternately formed in a repeated manner, thereby forming a C layer (having a thickness of 0.05 μm). Specifically, a C1 layer (TiN) was formed while adjusting the vapor deposition time so as to have a thickness of 10 nm under the conditions described below. Also, a C2 layer (AlCrN) was formed while adjusting the vapor deposition time so as to have a thickness of 10 nm under the conditions described below.

(Conditions for Forming C1 Layer)
Target: Ti
Introduced gas: $N_2$
Film forming pressure: 3 Pa
Arc discharge current: 150 A
Substrate bias voltage: −40V.
(Conditions for Forming C2 Layer)
Target: Al (50 atom %), Cr (50 atom %)
Introduced gas: $N_2$
Film forming pressure: 3 Pa
Arc discharge current: 150 A
Substrate bias voltage: −50V.
<Formation of B Layer>

The B layer ($Al_{0.7}Cr_{0.3}N$) was formed while adjusting the vapor deposition time so as to have a thickness of 0.2 μm under the conditions described below.
Target: Al (70 atom %), Cr (30 atom %)
Introduced gas: $N_2$
Film forming pressure: 4 Pa
Arc discharge current: 150 A
Substrate bias voltage: −35V
Table rotation speed: 3 rpm.
<Formation of A Layer>

The A layer (TiCN) was formed while adjusting the vapor deposition time so as to have a thickness shown in Table 2 under the conditions described below. At this time, the flow rate of introduced gas ($N_2$ and $CH_4$) was adjusted so as to achieve N:C (composition ratio) described in Table 3 or 4. Accordingly, the formed A layer included a region in which the N composition and the C composition changed in a slope-like manner or in a step-like manner in the thickness direction.
Target: Ti
Introduced gas: $N_2$, $CH_4$
Film forming pressure: 2 Pa
Arc discharge current: 180 A
Substrate bias voltage: −350V
Table rotation speed: 3 rpm.

Examples 12 to 25

In each of Examples 12 to 25, the composition of the A layer, the thickness of the A layer, the composition of the B layer, the thickness of the B layer, and the thickness of the C layer were changed into values shown in Tables 2 to 4. Except for the above, cutting tools of Examples 12 to 25 were manufactured in accordance with the method of manufacturing a cutting tool in the above Example 11. The continuous cutting life was measured using the manufactured cutting tool.

TABLE 2

| | | | Coating Layer | | | | | | | |
|---|---|---|---|---|---|---|---|---|---|---|
| | | | A Layer | | | | | | | Con- |
| | | | Compound Sintered Body-Side | | Outermost Surface-Side of Coating Layer | | B Layer | | C Layer | | tinuous |
| No. | | Compound Sintered Body | Composition | Thickness (μm) | Composition | Thickness (μm) | Composition | Thickness (μm) | Composition | Thickness (μm) | Cutting Life (km) |
| Example | 11 | Example 2 | TiCN*[21] | 0.1 | TiCN*[23] | 0.3 | $Al_{0.7}Cr_{0.3}N$ | 0.2 | Super-multiple Layers including TiN Layer (10 nm in Thickness) and AlCrN Layer (10 nm in Thickness) | 0.05 | 13 |
| | 12 | | | 0.35 | | | | | | | 20 |
| | 13 | | | 0.5 | | | | | | | 18 |
| | 14 | | | 0.68 | | | | | | | 19 |
| | 15 | | | 1 | | | | | | | 12 |
| | 16 | Example 2 | TiCN*[21] | 0.4 | TiCN*[23] | 0.3 | $Al_{0.7}Cr_{0.3}N$ | 0.2 | Super-multiple Layers including TiN Layer (10 nm in Thickness) and AlCrN Layer(10 nm in Thickness) | 0.1 | 22 |
| | 17 | | | | | | $Al_{0.5}Ti_{0.5}N$ | | | | 10 |
| | 18 | | | | | | $Al_{0.3}Ti_{0.3}Cr_{0.4}N$ | | | | 23 |
| | 19 | | | | | | $Al_{0.5}Si_{0.2}Cr_{0.3}N$ | | | | 20 |
| | 20 | | | | | | $Al_{0.75}V_{0.05}Cr_{0.2}N$ | | | | 20 |
| | 21 | Example 2 | TiCN*[22] | 0.3 | TiCN*[23] | 0.3 | $Al_{0.8}Cr_{0.2}N$ | 0.05 | Super-multiple Layers including TiN Layer (10 nm in Thickness) and AlCrN Layer (10 nm in Thickness) | 0.05 | 13.5 |
| | 22 | | | | | | | 0.11 | | | 19 |
| | 23 | | | | | | | 0.2 | | | 21 |
| | 24 | | | | | | | 0.9 | | | 18 |
| | 25 | | | | | | | 1.2 | | | 11 |

TiCN*[21] and TiCN*[22] in Table 2 are as shown in Table 3. TiCN*[23] in Table 2 is as shown in Table 4.

TABLE 3

| | Position Specified When Surface of A Layer Located on the Outermost Surface Layer-Side of Coating Layer is Defined as Starting Point (Proportion % in Thickness Direction)*[31] | N Composition | C Composition |
|---|---|---|---|
| TiCN*[21] | 0 to 15 | 1 | 0 |
| | 15 to 30 | 0.5→1 | 0.5→0 |
| | 30 to 70 | 0.5 | 0.5 |
| | 70 to 85 | 1→0.5 | 0→0.5 |
| | 85 to 100 | 1 | 0 |
| TiCN*[22] | 0 to 15 | 1 | 0 |
| | 15 to 30 | 0.3→1 | 0.7→0 |
| | 30 to 70 | 0.3 | 0.7 |
| | 70 to 85 | 1→0.3 | 0→0.7 |
| | 85 to 100 | 1 | 0 |

In Table 3, for example, "0.5→1" means that the composition gradually changes from 0.5 to 1.

In the column of "Position Specified When Surface of A Layer Located on the Outermost Surface Layer-Side of Coating Layer is Defined as Starting Point (Proportion % in Thickness Direction)*³" in Table 3, for example, "0 to 15" means a range between the surface of the A layer located on the outermost surface layer-side of the coating layer and the position spaced from this surface of the A layer toward into the A layer in the thickness direction of the A layer by 15% of the thickness of the A layer. Furthermore, "85 to 100" means a range between the position spaced from the surface of the A layer located on the outermost surface layer-side of the coating layer toward into the A layer in the thickness direction of the A layer by 85% of the thickness of the A layer and the surface of the A layer located on the opposite side of the surface of the A layer located on the outermost surface layer-side of the coating layer.

TABLE 4

| | Distance from Surface of A layer Located on the Outermost Surface Layer-Side of Coating Layer (μm) | N Composition | C Composition |
|---|---|---|---|
| TiCN*²³ | 0 to 0.05 | 0.5 | 0.5 |
| | 0.05 to 0.25 | 1 → 0.5 | 0 → 0.5 |
| | 0.25 to 0.30 | 1 | 0 |

In Table 4, for example, "1→0.5" means that the composition gradually changes from 1 to 0.5.

In each of Examples 11 to 25, the continuous cutting life was 8 km or more. Therefore, it turned out that, when hardened steel processing and the like are carried out, the processing accuracy in hardened steel processing and the like can be improved irrespective of the configuration of the coating layer, the composition of the A layer, the thickness of the A layer, the composition of the B layer, the thickness of the B layer, or the thickness of the C layer.

In each of Examples 11 to 25, the continuous cutting life was relatively long as compared with Example 2. Therefore, it turned out that, if a coating layer is formed on the surface of the composite sintered material, the processing accuracy can be further improved even in the case where hardened steel processing and the like are carried out.

In each of Examples 12 to 14, the continuous cutting life was relatively long as compared with Examples 11 and 15. Therefore, it turned out that, if the thickness of the A layer was 0.35 μm or more and 0.7 μm or less, the processing accuracy can be further more improved even in the case where hardened steel processing and the like are carried out.

In each of Examples 16, and 18 to 20, the continuous cutting life was relatively long as compared with Example 17. Therefore, it turned out that, if the B layer contains Cr, the processing accuracy can be further more improved even in the case where hardened steel processing and the like are carried out.

In each of Examples 22 to 24, the continuous cutting life was relatively long as compared with Examples 21 and 25. Therefore, it turned out that, if the thickness of the B layer was 0.1 μm or more and 1 μm or less, the processing accuracy can be further more improved even in the case where hardened steel processing and the like are carried out.

It should be understood that the embodiments disclosed herein are illustrative and non-restrictive in every respect. The scope of the present invention is defined by the terms of the claims, rather than the description of the embodiments provided above, and is intended to include any modifications within the meaning and scope equivalent to the terms of the claims.

REFERENCE SIGNS LIST 11 first peak, 13 top point, 15 intersection point.

The invention claimed is:
1. A composite sintered material that contains cubic boron nitride particles and binder particles,
   the composite sintered material containing 40 vol % or more and 80 vol % or less of the cubic boron nitride particles,
   the binder particles containing TiCN particles,
   the composite sintered material showing a first peak belonging to a (200) plane of the TiCN particles in a range in which a Bragg angle 2θ is 41.7° or more and 42.6° or less in an X-ray diffraction spectrum measured using a Cu-Kα ray as a ray source,
   assuming that a horizontal axis x in the X-ray diffraction spectrum indicates a Bragg angle 2θ, that a vertical axis y in the X-ray diffraction spectrum indicates diffraction intensity, and that a maximum value of a peak height of the first peak is defined as $I_{max}$, a difference between a maximum value and a minimum value of Bragg angles 2θ being 0.4° or less, the Bragg angles 2θ being measured at two or more intersection points of a straight line $y=I_{max}/2$ and the first peak, and
   the binder particles having an average particle size of 50 nm or more and 200 nm or less, wherein
   in the X-ray diffraction spectrum, a peak height ratio ($I_{TiCN}/I_{cBN}$) of a peak height $I_{TiCN}$ of a peak belonging to the (200) plane of the TiCN particles to a peak height $I_{cBN}$ of a peak belonging to a (111) plane of the cubic boron nitride particles is 0.8 or more and 2.2 or less.
2. The composite sintered material according to claim 1, wherein
   the peak height ratio ($I_{TiCN}/I_{cBN}$) is 1.6 or more and 2.0 or less.
3. The composite sintered material according to claim 1, wherein
   the composite sintered material contains 50 vol % or more and 60 vol % or less of the cubic boron nitride particles, and
   the Bragg angle 2θ is 42.2° or more and 42.6° or less at the maximum value of the peak height of the first peak.
4. A surface-coated boron nitride sintered material tool, in which at least a cutting edge portion includes: a composite sintered material containing cubic boron nitride particles and binder particles; and a coating layer provided on a surface of the composite sintered material,
   the composite sintered material being the composite sintered material according to claim 1,
   the coating layer including an A layer and a B layer,
   the A layer being provided as an outermost surface of the coating layer or provided between the outermost surface of the coating layer and the B layer,
   a distance between the outermost surface of the coating layer and an upper surface of the B layer being 0.1 μm or more and 1.0 μm or less,
   the A layer being formed of $Ti_{1-s}Ma_sC_{1-t}N_t$ (where Ma indicates at least one element of Cr, Nb and W; 0≤s≤0.7; and 0<t≤1), and the B layer being formed of $Al_{1-x-y}Cr_xMc_yN$ (where Mc indicates at least one element of Ti, V and Si; $0 \leq y \leq 0.6$; $0.2 \leq 1-x-y \leq 0.8$; and $0<x+y<1$).

* * * * *